United States Patent [19]

Hawker et al.

[11] Patent Number: 5,790,679
[45] Date of Patent: Aug. 4, 1998

[54] COMMUNICATIONS TERMINAL HAVING A SINGLE TRANSDUCER FOR HANDSET AND HANDSFREE RECEIVE FUNCTIONALITY

[75] Inventors: Larry Edward Hawker, Nepean; Andre John Van Schyndel, Kanata; Christopher Michael Forrester, Ottawa, all of Canada

[73] Assignee: Northern Telecom Limited, Montreal, Canada

[21] Appl. No.: 659,609

[22] Filed: Jun. 6, 1996

[51] Int. Cl.⁶ .................... H04R 25/00; H04M 1/00; H04M 9/00
[52] U.S. Cl. ............ 381/163; 381/188; 379/420; 379/428; 379/433
[58] Field of Search ............ 379/420, 428, 379/433, 421–427, 429–430; 455/89, 90; 381/163, 157, 168, 169, 183, 187; 181/155, 156

[56] References Cited

U.S. PATENT DOCUMENTS

| | | | |
|---|---|---|---|
| 4,079,213 | 3/1978 | Bage et al. | 179/110 |
| 4,549,631 | 10/1985 | Bose | 181/155 |
| 5,010,566 | 4/1991 | Seo | 379/61 |
| 5,025,885 | 6/1991 | Froeschle | 181/156 |
| 5,224,151 | 6/1993 | Bowen et al. | 379/420 |
| 5,276,916 | 1/1994 | Pawlish et al. | 455/89 |
| 5,402,486 | 3/1995 | Wang et al. | 379/433 |
| 5,432,835 | 7/1995 | Hashimoto | 379/379 |
| 5,461,672 | 10/1995 | Enokido et al. | 379/433 |
| 5,471,019 | 11/1995 | Maire | 181/156 |
| 5,610,971 | 3/1997 | Vandivier | 379/433 |
| 5,630,211 | 5/1997 | Nagai | 379/433 |
| 5,655,017 | 8/1997 | Fishman | 379/433 |
| 5,664,012 | 9/1997 | Chen | 379/433 |
| 5,664,015 | 9/1997 | Ford et al. | 379/433 |
| 5,668,867 | 9/1997 | Nagai | 379/433 |

FOREIGN PATENT DOCUMENTS

| | | | |
|---|---|---|---|
| 1199138 | 1/1986 | Canada | 379/109 |
| 0 283 853 A2 | 9/1988 | European Pat. Off. | |
| 0 651 546 A1 | 5/1995 | European Pat. Off. | |
| 2210233 | 1/1989 | United Kingdom | 379/420 |

*Primary Examiner*—Curtis Kuntz
*Assistant Examiner*—Rexford N. Barnie
*Attorney, Agent, or Firm*—Jean-Pierre Fortin

[57] ABSTRACT

A wireless terminal for personal communication systems is provided with selective handsfree or handset receive mode of operation utilizing a single transducer. The transducer is mounted within a specially designed enclosure having front and back chambers each with strategically located acoustic ports for shaping the frequency response and providing good quality audio in each mode. Electronic equalization may be employed to further adjust the amplifier gain and shape the frequency response for dual mode operation.

10 Claims, 1 Drawing Sheet

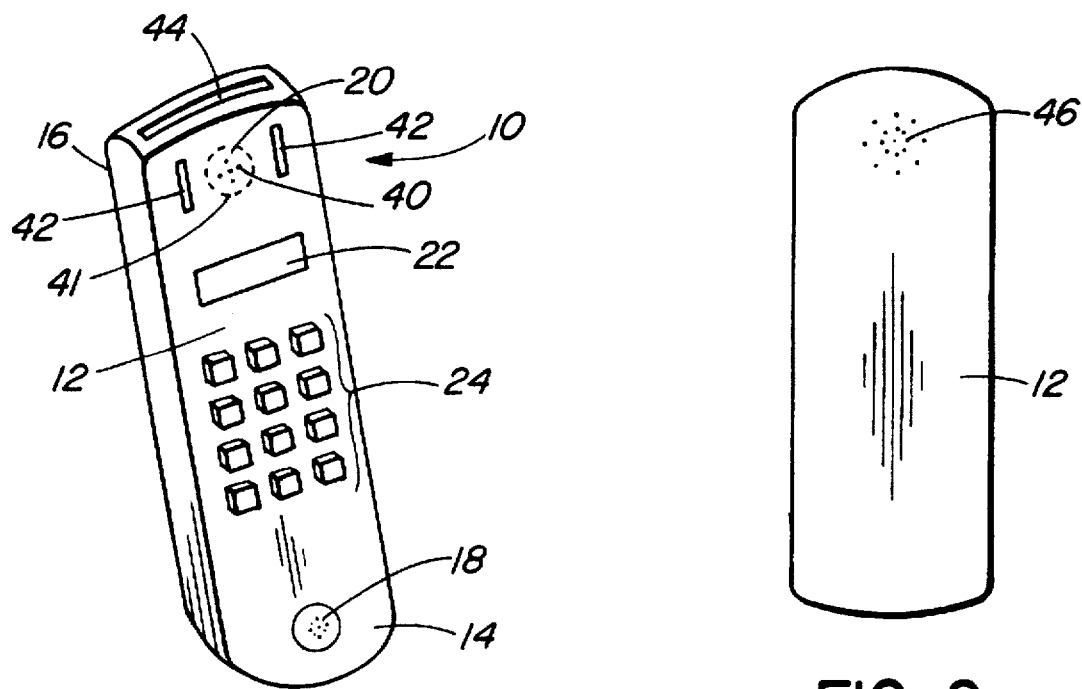
FIG. 1
FIG. 2
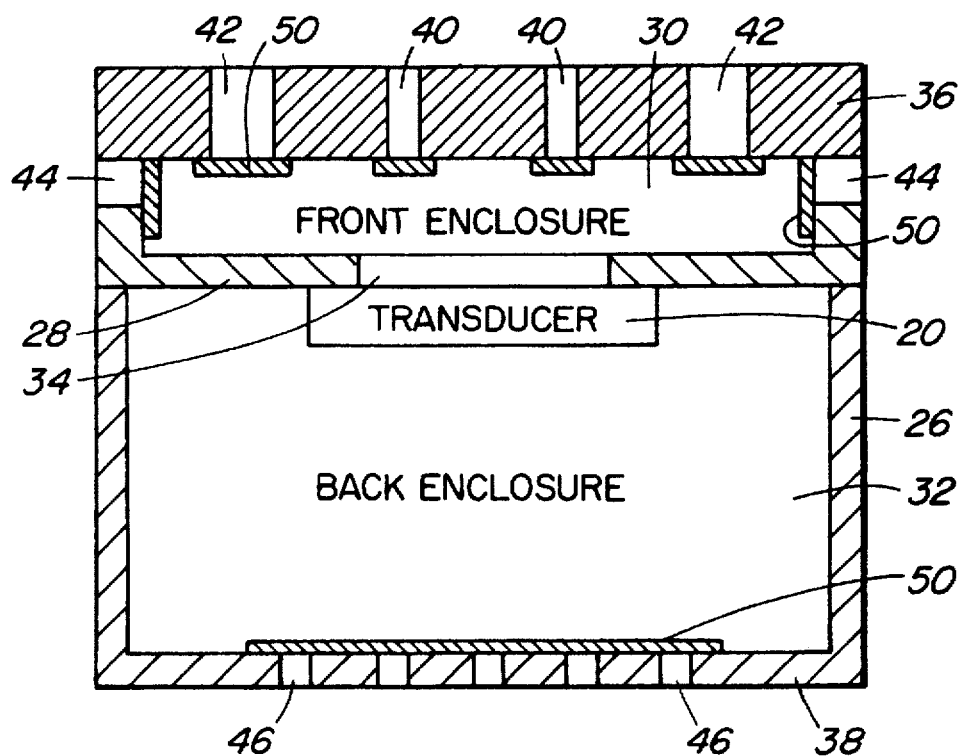
FIG. 3

COMMUNICATIONS TERMINAL HAVING A SINGLE TRANSDUCER FOR HANDSET AND HANDSFREE RECEIVE FUNCTIONALITY

FIELD OF INVENTION

This invention relates to a communications device such as a wireless terminal and more particularly to such a device wherein a single transducer provides both receiver (handset) mode and loudspeaker (handsfree) mode operation.

BACKGROUND OF INVENTION

Communication devices including wireless terminals for personal communication systems and the like conventionally use a single receiver which is held close to the user's ear during operation for both privacy and good audio quality. Recently, however, devices have been developed which also include a loudspeaker, either as an integral part of the handset, or as an accessory, to provide either just handsfree listening or as part of a complete handsfree (transmit and receive) function. Users of such telephone services as voice mail and automated answering systems often find it more convenient to navigate these systems through the use of the dial pad while listening to the instructions through the loudspeaker as opposed to continuously moving the handset away from the ear to see the dial pad. This becomes even more important when the terminal has an integral display which the user needs to see and perhaps write on while listening.

In the interest of conserving space and minimizing component and assembly costs it would be advantageous to provide both the handset or receiver function and handsfree or loudspeaker mode with a single transducer. At the same time, of course, the audio quality must satisfy various industry standards and meet user expectations while the terminal is either closely or loosely coupled to the ear in handset mode or at some distance from the user's ear in handsfree mode.

PRIOR ART

As indicated previously, some manufacturers of wireless terminals have both handset and handsfree functionality in their products. These products, however, achieve the dual mode operation through the use of separate transducers for each function. It is known to use "leak-insensitive" or "low acoustic output impedance" receivers in terminals in order to provide good audio quality when the handset is loosely coupled to the ear. These terminals, however, do not provide handsfree functionality.

SUMMARY OF THE INVENTION

It is an object of the present invention to provide a communications terminal having a single transducer for both handsfree and handset receive functionality.

It is a further object of the invention to provide the dual mode functionality through the use of a specially configured transducer enclosure.

Therefore, in accordance with a first aspect of the present invention, there is provided a communications terminal having a transducer to provide receive mode and loudspeaker mode functionality. The terminal has a housing in which is located a transducer enclosure. The enclosure has first and second chambers separated by a partition with a transducer mounted on the partition. Each of the first and second chambers has at least one strategically positioned and shaped acoustic port communicating with the exterior of the terminal.

In a preferred embodiment of the invention the communications terminal is a wireless terminal for a personal communication system. The enclosure is incorporated into the terminal such that the acoustic ports are in the housing of the terminal.

In accordance with a second aspect of the invention there is provided a transducer enclosure for use in a communications terminal. The enclosure has first and second chambers separated by a partition. A transducer is mounted on the partition, the transducer being configured to operate in both handset and handsfree mode. The first and second chambers each have at least one acoustic port communicating to the exterior of the enclosure.

BRIEF DESCRIPTION OF THE DRAWINGS

The invention will now be described in greater detail with reference to the attached drawings wherein:

FIG. 1 is a perspective view of a wireless terminal in accordance with one embodiment of the present invention;

FIG. 2 is a back view of the terminal; and

FIG. 3 is a cross-sectional view of the transducer/enclosure.

FIG. 1 illustrates one example of a wireless terminal such as might be used in a personal communication system. It is to be understood that the invention has equal application in other types of communication devices such as cordless terminals and pagers.

As shown in FIG. 1, terminal 10 includes a case or housing 12, having a transmit end 14 and a receive end 16. Positioned close to transmit end 14 is a transmit transducer 18 for converting audio into an electrical signal. A receive transducer 20 is located proximate receive end 16. FIG. 1 also illustrates display 22 and key pad 24 as known in the art.

As shown more clearly in FIG. 3, receive transducer 20 is located within transducer enclosure 26 which in a preferred embodiment is cylindrical. It is to be understood, however, that the enclosure may have other configurations in plan such as square, rectangular or elliptical.

In the illustrated embodiment the enclosure has a partition 28 which divides the enclosure into two chamber 30,32. The transducer is mounted in or coaxially with an opening 34 in partition 28. It will be noted that in FIG. 3 the two chambers do not have equal volumes by virtue of the partition being closer to one end of the cylinder. Top 36 and bottom 38 close each of the chambers. It will be apparent to one skilled in the art that the top 36 and bottom 38 can be part of the terminal case 12 wherein the cylindrical member is sealed directly to the inner surface of the case. It should also be noted that the dimensional relationship between the two chambers is not critical but is a function of other acoustic properties of the enclosure including number, size and location of the acoustic ports to be described in greater detail later.

Transducer 20 in an exemplary embodiment is a twenty eight mm diameter flat loudspeaker. Enclosure 26 and partition 28 can be molded or otherwise formed of the same or similar plastics material as used for the terminal casing.

In the embodiment shown in FIG. 3 front chamber 30 has an approximate volume of 2 cc and back chamber 32 has an approximate volume of 5 cc.

Chamber 30 as shown in FIG. 3 is located towards the front face of the terminal. Chamber 30 is provided with an arrangement of apertures or ports 40 aligned with the transducer 20. The ports 40 are all located within a circular portion 41 of the top face such that they are easily sealed within the knife-edge of a frequency response testing artificial ear. As shown ports 40 are generally aligned with the opening 34 in partition 28 so as to provide a clear path for the sound waves from the transducer to the user's ear. FIG. 3 shows a second set of ports 42 in the front chamber 30 located just outside the boundary of the knife-edge and these ports are not sealed during frequency response testing. A third port 44 in chamber 30 exits through the side of the enclosure or casing where it is unlikely to be inadvertently sealed or blocked by the user. The exact location of ports 42 and 44 is not critical although they will be separated from ports 40 so that they will not be coupled to the user's ear in the handset receive mode and positioned such that they will not be otherwise inadvertently covered by the user. It is also within the scope of the present invention to combine ports 42 and 44 into one slot or set of slots at selected locations such as at or near the parting line of the mold used to form the terminal casing.

In an exemplary embodiment there are thirteen ports 40 each having a diameter of approximately 2 mm. Ports 42 outside the knife-edge of the artificial ear are preferably two slits each 2 mm wide and 21 mm long. It will be apparent that the slits can, however, be made of circular apertures or other arrangements of slits. Port 44 at the side of the enclosure or terminal casing is a single slit 1.5 mm wide and 40 mm long. As before this port can be made up of other arrangements of slits as long as the two areas are approximately equal to the area defined by the aforementioned slit.

Back chamber 32 has a set of ports 46 (FIG. 2) to the back face of the terminal. In the exemplary embodiment the ports 46 comprise fifteen holes, each having a diameter of approximately 2 mm. The various acoustic ports discussed above provide frequency response shaping. Port 44 in front chamber 30 also provides acoustic safety by ensuring that when the terminal is well coupled to the user's ear sufficient acoustic energy is shunted. As before ports 44 can be formed by a single slot or a set of slots located in the back face, side wall or in the parting line.

Acoustic resistance material such as an acoustic screen 50 over certain sets of ports also provides frequency response shaping and minimizes the effects of any resonances between the ports and the chambers.

It is also within the scope of the present invention to place acoustic foam in one or both of chamber 30,32 in order to increase the effective volumes and minimize the effects of any resonances.

As discussed previously, enclosure 26 can be closed by means of integral top and bottom members although in a practical implementation the front and back faces of the terminal housing or casing will be used. It is also within the scope of the invention to arrange other components within the terminal housing so as to form the appropriate chambers. In this case it will be necessary to configure the physical dimensions of the various ports and to select the proper characteristics of the acoustic resistance material and foam to accommodate some effects due to internal channels and cavities created by circuit boards and the other components. This implementation may also require the addition of, or an adjustment to, the electronic equalization.

In operation, the transducer provides good audio quality to the user in handset mode while the terminal is loosely or firmly coupled to the user's ear. In handsfree mode the output of the audio amplifier is increased to raise the level of the audio sufficiently to allow the user to hear the calling party while holding the terminal well away from the ear. There may also be some adjustment of the electronic equalization of the amplifier circuit in order to adjust the frequency responses.

To ensure acceptable audio for the three modes of operation, i.e. handset receive mode with terminal tightly held to the user's ear; handset receive mode with the terminal loosely coupled to the user's ear and; handsfree receive mode, the output audio level as a function of frequency must fall within a certain range. It is within the scope of the present invention to achieve this range by the design of the transducer enclosure and acoustic ports. It is also within the scope of the invention to employ appropriate amounts of electronic equalization i.e. shaping the frequency response electronically, to achieve the required amplifier output over the desired audio frequency range. Ideally, the frequency response is substantially flat over the frequency range 300 Hz to 3300 Hz. Electronic equalization can also be used, in conjunction with the acoustic ports, to provide for changes in the output levels between the handset and handsfree modes of operation to ensure that the amplitude associated with handsfree receive is not directed to the user while the terminal is held loosely or tightly against the user's ear.

The terminal may be equipped with a manual switch to select as between handset and handsfree mode. In a preferred embodiment, however, the terminal will have a proximity detector which automatically switches modes depending on the proximity of the terminal to the user's ear. Details respecting the proximity detector and safety switch may be found in co-pending U.S. application Ser. No. 08/615,908 filed Mar. 14, 1996 by A. Van Schyndel. The contents of U.S. application Ser. No. 08/615,908 are incorporated herein by reference.

While the preferred embodiment of the invention has been described and illustrated it will be apparent to one skilled in the art that variations in the design may be made. The scope of the invention, therefore, is only to be limited by the claims appended hereto.

We claim:

1. A communications device having a casing defined by a front face, a back face and respective side walls, a transducer enclosure between said front face and said back face with a transverse partition separating said enclosure into first and second chambers, and a receive transducer for providing handset and handsfree receive functionality mounted on said partition, said first chamber having a plurality of acoustic ports comprising a first set thereof exiting from the front face in approximately co-axial alignment with said transducer and a second set of acoustic ports concentrically spaced from said first set of acoustic ports and exiting from the front face in an area not in alignment with the transducer and said second chamber having at least one acoustic port.

2. A transducer enclosure for use in a communication device adapted to provide handset and handsfree receive functionality, said enclosure having first and second chambers separated by a partition with a transducer mounted on said partition and facing into the first chamber wherein said second chamber has at least one acoustic port communicating with the exterior of the enclosure, said first chamber having a side wall and a face wall and having a plurality of acoustic ports comprising a first set thereof exiting through the face wall and located in an area approximately aligned with the transducer, and a second set of acoustic ports concentrically spaced from said first set of acoustic ports and exiting through the face wall in an area not aligned with the transducer.

3. A communications device as defined in claim 1 wherein the acoustic ports of the first set are all located within a circular area of the front face such that they are within a circle circumscribed by the knife-edge of a standard frequency response testing artificial ear.

4. A communications device as defined in claim 3 wherein the acoustic ports of the second set exit on the front face in an area outside said circular area of the first set of acoustic ports.

5. A communications device as defined in claim 4 wherein the acoustic ports of the second set exiting to a pair of slots one on each side of said circular area of the first set of acoustic ports.

6. A communications device as defined in claim 1, wherein the plurality of acoustic ports further comprises a third set of acoustic ports located on the walls of the first chamber and exiting on at least one side wall of the device.

7. A communications device as defined in claim 6 wherein the third set of acoustic ports exit on the end wall of the device.

8. A transducer enclosure as defined in claim 2 wherein the acoustic ports of the first set are all located within a circular area of the front face such that they are within a circle circumscribed by the knife-edge of a standard frequency response testing artificial ear.

9. A transducer enclosure as defined in claim 8 wherein the acoustic ports of the second set exit on the front face in an area outside said circular area of the first set of acoustic ports.

10. A transducer enclosure as defined in claim 2, wherein the plurality of acoustic ports further comprises a third set of acoustic ports located along the side wall of the first chamber.

* * * * *